O. M. FEE.
MUSICAL NOTATION.
APPLICATION FILED OCT. 28, 1921.
1,424,718. Patented Aug. 1, 1922.
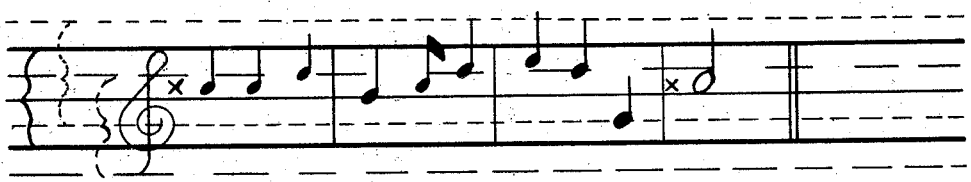
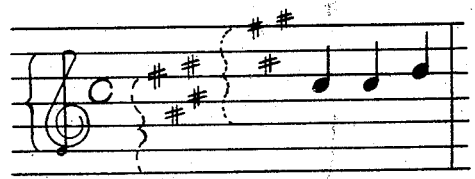
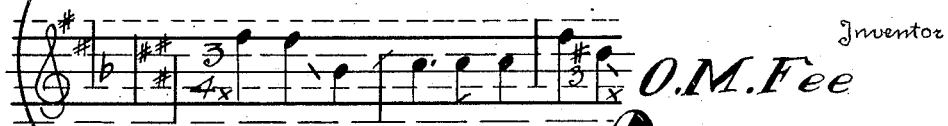
Inventor
O. M. Fee

UNITED STATES PATENT OFFICE.

ORLANDO M. FEE, OF LA MANDA PARK, CALIFORNIA.

MUSICAL NOTATION.

1,424,718.　　　Specification of Letters Patent.　　Patented Aug. 1, 1922.

Application filed October 28, 1921. Serial No. 511,095.

*To all whom it may concern:*

Be it known that I, ORLANDO M. FEE, a citizen of the United States, residing at La Manda Park, in the county of Los Angeles and State of California, have invented certain new and useful Improvements in a Musical Notation; and I do hereby declare the following to be a full, clear, and exact description of the invention, such as will enable others skilled in the art to which it appertains to make and use the same.

The object of the invention is to provide a system or revised method of musical notation whereby the teaching of music is facilitated and more particularly whereby the transposition of music to vary the pitch, both in vocal and instrumental music may be attained without difficulty or substantial confusion on the part of the performer and without an extensive knowledge of the theory of music such as harmony or thoroughbase; and in this connection to provide the method of composing and publishing music whereby a single copy will represent, ready for performance, either vocally or instrumentally or both, a given composition in high, low and medium registers; and with these objects in view the invention consists in a method involving a graphic representation illustrated in the accompanying drawing, wherein:

Figure 1 is a view of a staff upon which is represented a phrase of music arranged in accordance with the invention.

Figure 2 is a similar representation wherein the signatures representing the transpositions are included.

Figure 3 is a view of a two staff, or treble and bass staff phrase.

The system contemplates the use of an augmented staff comprehending a plurality of conventional staves or staves as they are now used and which consist of five lines and four spaces, and in the construction illustrated the augmented staff includes seven lines by the addition of one below and one above the normal or conventional staff, and in practice it is proposed to distinguishably designate these several staffs represented by different groups of five lines constituting the selectively available staffs which may be used in reading the music represented by the notes appearing thereon.

In the drawing these several groups of lines representing selectively available conventional staves are distinguished by the characters of the marginal lines thereof as for example the intermediate or main group or staff is provided with marginal heavy lines, while the lower selective staff is provided with marginal dash lines and the upper selective staff is represented by marginal dotted lines. In practice colors may be used for distinguishing these groups of lines representing staves, as for example the main or intermediate staff may be provided with marginal lines of red, while the lower staff may have marginal lines of green and the upper staff may have marginal lines of blue.

In practice the several groups of lines representing the alternative staves may be connected or embraced by brackets as shown at the left in Figure 1 and the brackets may be distinguishably designated by the character of the lines or the color thereof to correspond with those of the staves to which they refer.

Moreover in practice it is preferred that the clef as shown shall be disposed on the main or intermediate staff in the ordinary way and such a position as to designate the degrees of the staff in accordance with the conventional method, the G clef or treble clef being represented in the drawings, Figure 1, placed upon the second line (counting as usual from the bottom) to indicate that the note G occurs on the second line of the staff. The notes representing the music are represented on the main or intermediate staff which as hereinabove indicated is distinguishably designated with reference to the alternative staves by being provided with marginal heavy lines, and whether the phrase of music appearing thereon or in any preferred key (in which case a suitable signature should also appear as in the ordinary practice) it is obvious that the music can be read as ordinarily in the pitch in which it is written, with the supplemental lines below and above the staff which is being used performing the fuction as in the ordinary practice of leger lines.

When it is desired however, as for example in vocal music, to adapt the piece which is published for example as shown in the drawing, Figure 1, for use by a higher voice, (the intermediate or main staff representing a medium register of voice,) the lower group or staff should be employed and the notes appearing on the augmented staff should be read as they are positioned on the selected staff. In this case, assuming that the clef is G, and is moved with the staff which is to be used so that the leger C appears on the second line of the staff, it will be obvious that the first note appearing in the illustration of Figure 1 instead of being C as written on the main or intermediate staff will be E and the music may then be reproduced accordingly and therefore at a higher pitch by two degrees or whole tones than written on the intermediate staff. In the same way if a lower pitch of the music is desired the upper alternative or selective staff may be used, in which event, assuming again that the clef is as indicated in Figure 1 and therefore positions the note G on the second line of the selected staff, it is obvious that the first note appearing in the illustration in Figure 1 will be A.

Of course the tonic of the key or scale in which the piece is written will determine the signature or the sharps or flats, which must be read into the composition in order to agree with the scale in which the music pitched, and therefore, for the convenience of the performer it is desirable to indicate the tonic of the scale, or the note or notes representing the tonic of the scale, in which the piece is written or printed as an easy method of designating the scale. To this end as shown in the drawing, Figure 1, a small dot or mark, in this instance a cross, is represented in advance of the first note occurring on the staff and at intervals throughout the composition where the same note, C in this instance, appears, as a reminder to the performer that this note represents the tonic of the key in which the composition is written. Therefore, as represented on the intermediate or medium register staff, as shown in Figure 1, the note C represents the tonic of the composition or of the key in which the composition is written and therefore that the said composition is in the key of C in which there are no sharps or flats in the signature. Of course accidentals may occur from time to time in the composition and must be provided for in accordance with their known characteristics in raising or lowering the pitch of the tone represented by the note in connection with which they are used.

Now assuming for example that the upper voice register is to be used or in other words that the composition will be reproduced in accordance with the lower staff in which the first note appears in the example shown as E, it is obvious that the composition must then be reproduced in the key of which the signature is represented by four sharps. As indicated in the example Fig. 2, this signature may be represented on the staff to which it relates or it may simply be left to the knowledge of the performer that as the key of E involves four sharps affecting the notes occurring as F, C, G and D, a corresponding modification must be made in reproducing the composition as read on the transposed staff.

In the same way if the lower voice register is desired and therefor the composition is read as it appears on the upper selective or alternative staff wherein the tonic appears in the second space and is A, the signature consisting of three sharps may appear as indicated in Figure 2 or it may simply be remembered by the performer so that proper allowance may be made for the same in the reproduction.

As a means of communicating a knowledge relatively of the scales or keys and their relation to the keyboard of an instrument of the piano or organ type the arrangement above indicated, particularly when used in comparison with the keyboard, materially facilitates appreciation by the student of the principle involved by presenting the subject graphically and avoiding to a great extent the necessity of considering the same only in the abstract, and as will be obvious, in the manner of transposition, the work of the publisher is materially facilitated in that the composition published in one key is adapted to cover at least three keys and with no additional expense other than that which might be incurred in the representation of the augmented staff as compared with the ordinary or conventional staff.

As the space between the treble and bass staves of music written in accordance with the conventional notation, wherein said staves are usually provided respectively with different clefs G and F, which place the notes E, G, B, D, F on the lines of the treble staff and the notes G, B, D, F, A on the lines of the bass staff allows only space for one leger line below the treble staff or one leger line above the base staff, for the note C, it is obvious that music thus written on two staves using the conventional clef designations must omit the seventh or upper line of the lower or bass staff and be limited to six lines for the bass staff, in order to avoid confusion. But when the full seven line augmented staff arrangement is to be used for both treble and bass, the above difficulty can be overcome by using the G clef and corresponding designations of the degree of both staves, as shown in Figure 3. There is then room for the extra line C below the conventional treble staff and the extra line A above the bass staff having the treble degree designations.

Having thus described the invention, what I claim is:—

1. A method of forming a musical notation enabling easy transposition of a musical composition comprising adding to an ordinary five line staff a line above or below said staff or both, connecting the lines of this augmented staff in groups of five, marking each group with an appropriate signature so that the composition as written will read correctly in the signature marked.

2. A method of forming a musical notation enabling easy transposition of a musical composition comprising augmenting a staff by increasing the number of lines, and in connecting the lines of the staff thus augmented in groups, and in applying signatures to the groups so that the composition as written will read correctly in the signature marked.

3. A method of forming a musical notation enabling easy transposition of a musical composition comprising adding a line to the lines of a staff, connecting the lines thus augmented in groups, marking each group with an appropriate signature so that the composition as written will read correctly in the signature marked.

In testimony whereof I affix my signature in presence of two witnesses.

ORLANDO M. FEE.

Witnesses:
J. T. ENGLE,
PAUL M. ST. JOHN.